United States Patent [19]

Carmien

[11] Patent Number: 4,570,988

[45] Date of Patent: Feb. 18, 1986

[54] REINFORCED TOOL HANDLE AND METHOD OF MANUFACTURING SAME

[76] Inventor: Joseph A. Carmien, 525 Maple Ave., Beverly Hills, Calif.

[21] Appl. No.: 667,408

[22] Filed: Nov. 5, 1984

Related U.S. Application Data

[63] Continuation of Ser. No. 407,818, Aug. 13, 1982, abandoned.

[51] Int. Cl.⁴ .............................................. B25G 1/10
[52] U.S. Cl. ...................................... 294/57; 294/19.1
[58] Field of Search ...................... 294/57, 58, 19, 24, 294/27 H, 86; 16/110 R, 138.8 B; 156/180, 181, 379.6, 441, 449

[56] References Cited

U.S. PATENT DOCUMENTS

| | | | |
|---|---|---|---|
| 2,948,649 | 8/1960 | Pancherz | 156/180 |
| 3,549,189 | 12/1970 | Alosi | 294/57 |
| 3,712,659 | 1/1973 | Kneissl | 294/57 |

Primary Examiner—James B. Marbert
Attorney, Agent, or Firm—Fulwider, Patton, Rieber, Lee & Utecht

[57] ABSTRACT

A reinforced tool handle and a method of producing the same are provided by which a hollow fiberglass rod is produced with a solid section integrally formed at predetermined stress points. The tool handle of this invention is formed by alternately feeding sections of a light weight core and a relatively strong solid core into the center of a die tube. The alternate cores are uniformly surrounded by resin coated fibers and pulled through the die tube to form a continuous rod having alternate light weight and strong solid cores. The continuous rod can then be cut as desired to form the reinforced tool handle of the present invention.

21 Claims, 5 Drawing Figures

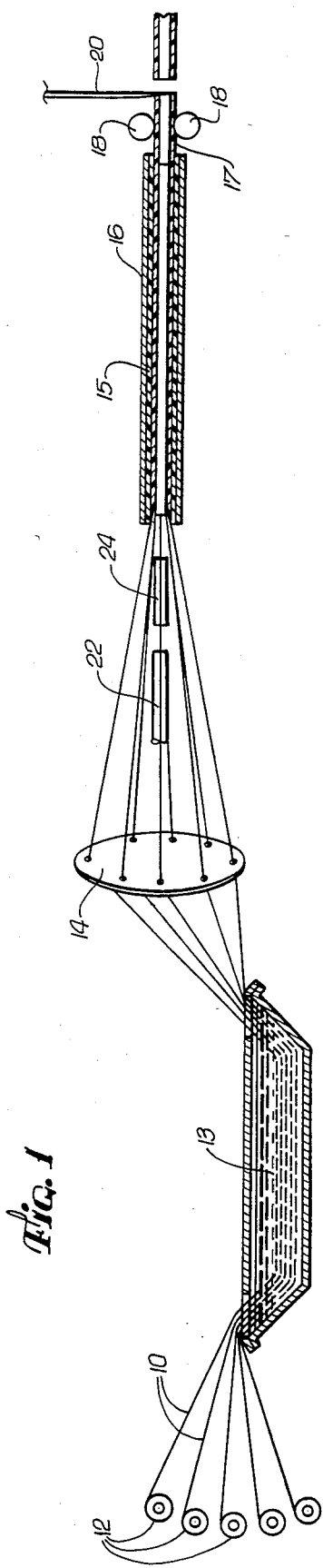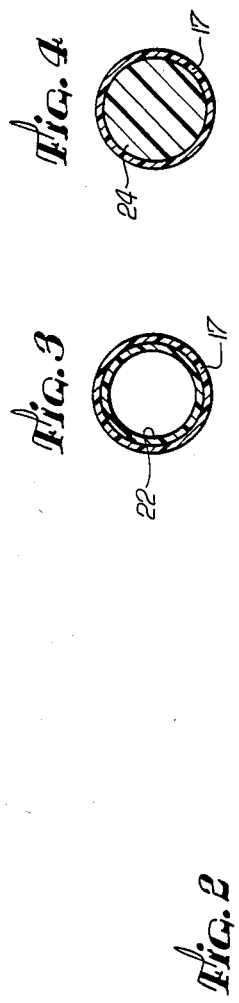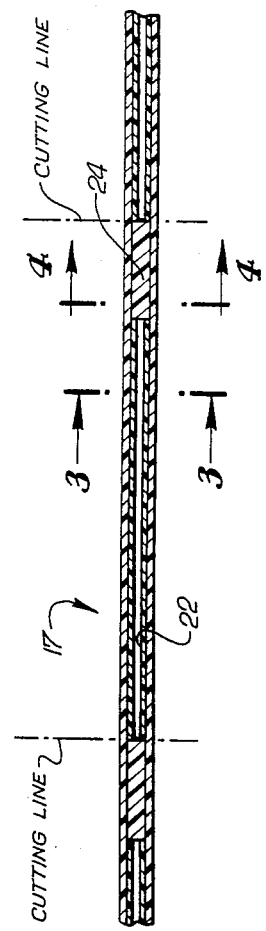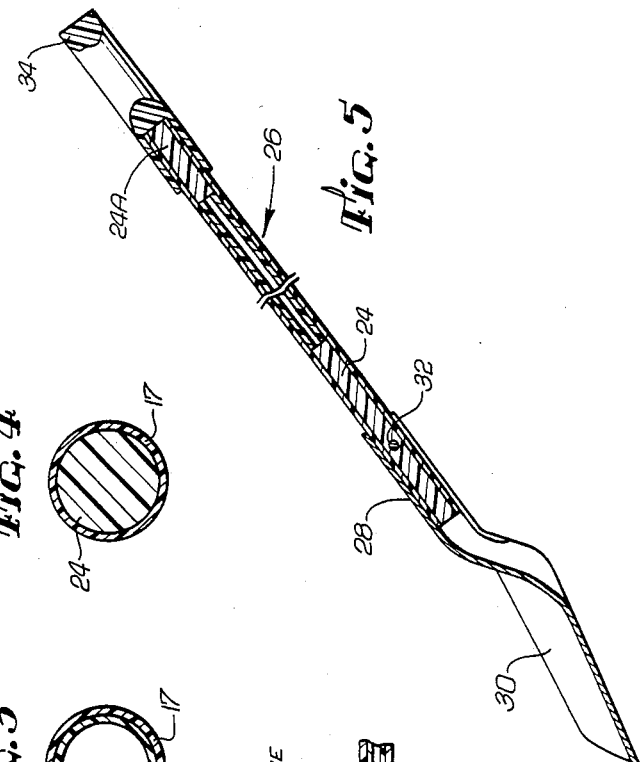

4,570,988

REINFORCED TOOL HANDLE AND METHOD OF MANUFACTURING SAME

This application is a continuation, of application Ser. No. 407,818, filed Aug. 13, 1982.

BACKGROUND OF THE INVENTION

This invention relates to fiber-resin composite pultrusion methods and products, and, more particularly, to a method for pultruding rods of alternately hollow and solid cross section.

The basic techniques for running filaments through a resin bath and then into a long heated die tube to produce a cured composite of the same shape as the die tube has been known for some time. See, for example, U.S. Pat. Nos. 2,948,649 and 3,556,888. The drawback of this method is that, for certain applications, the solid extruded product is unacceptably heavy. One such application is a composite replacement for wooden handles, such as a shovel.

The weight problem could be alleviated by means of an existing process to extrude hollow tubes utilizing a die tube with the center filled, leaving an annular cross section through which the fibers are pulled. Although this process can produce a light, hollow tube, it would clearly have a bending or crushing strength significantly lower than that of a solid rod, and therefore would not be suitable for certain high-stress applications, such as shovel handles. Moreover, conventional machines for producing continuous hollow tubing are extremely expensive.

The bending stress problem can be solved by producing a rod which is hollow throughout most of its length but is solid in the area of maximum stress, near the head of a shovel, for example. The current pultrusion techniques provide no convenient and inexpensive way to produce such a reinforced product. However, in accordance with presently known practices, the reinforced tubing referred to above could be produced in several ways. For example, a solid pultruded rod could be bored out through most of its length, or a hollow pultruded tube could have a solid plug glued into its center for some fraction of its length. The boring method has the disadvantage of wasting material and being time consuming. The plugging method has the additional disadvantage of lowered strength due to the imperfect fit of the plug. Both of these methods would be too costly to provide an economical means of mass producing shovel handles or the like.

Accordingly, there has existed a need for a convenient and effective method for producing a continuous rod with an alternately solid reinforcing and hollow cross section in a quick and inexpensive manner. As will become apparent from the following, the present invention satisfies this need and provides other related advantages.

SUMMARY OF THE INVENTION

The present invention resides in a continuous rod with alternating non-reinforcing and segments which can then be cut into a finished product that is a light, hollow rod with an integral reinforced segment in the area or areas of maximum stress, as well as a method of producing such a rod. Moreover, the method of the present invention is trouble-free and reliable in use and the finished product is lightweight yet relatively strong.

More specifically, the method of the present invention may include the alternating insertion of a section of thin-walled tubing or light weight solid rod of a predetermined length and then a section of solid reinforcing material into the center of the pultrusion die tube. The reinforcing material is preferably a fiber-resin composite material which is similar or identical to the material being formed around it. The fibers are then wrapped around these cores and compressed and heated in the die tube in the standard fashion. The result is a continuous rod which is hollow where the core was thin-walled tubing and reinforced where the core was solid or rigid. This continuous rod can easily be cut into the finished product which is part solid and part hollow.

The solid or rigid reinforcing section is used in the high stress areas of the finished product and the result is a relatively light weight rod which is also of optimum strength due to the perfect fit of the integral inner core. This method is faster and less expensive than boring solid rods or plugging hollow ones and has mechanical properties superior to the plug version because in that process there would be an imperfect fit between the tube and the core.

It is to be understood that in this specification, reference to a rod is to be construed as including long members of any pultrudable cross section, circular or ellipse, etc. If a non-circular cross section for the hollow segment is desired, the plugging and boring methods could accomplish it only with the most exacting and costly machining. On the other hand, the method of the present invention allows convenient insertion of any shape core into the center of the die tube, thereby allowing infinite variety in the final product's cross section, which may be required by unusual stress loading applications. Moreover, although reference is made herein to a hollow insert, generally of thin-walled plastic tubing, a light weight solid core would also accomplish the desired result.

Other features and advantages of the present invention will become apparent from the following detailed description taken in conjunction with the accompanying drawings, which illustrate, by way of example, the principles of the invention.

BRIEF DESCRIPTION OF THE DRAWINGS

FIG. 1 is a schematic representation of a pultrusion machine adapted to perform the method of the present invention;

FIG. 2 is a fragmentary cross sectional view of a pultruded rod of the present invention with an alternating hollow and solid configuration;

FIG. 3 is an enlarged cross-sectional view of the hollow rod section of FIG. 2, and taken substantially along line 3—3 of FIG. 2;

FIG. 4 is a similarly enlarged cross-sectional view of the solid rod section of FIG. 2, and taken substantially along line 4—4 of FIG. 2;

FIG. 5 is a partly sectional view of the product of the present invention in use as a shovel handle.

DETAILED DESCRIPTION

As shown in the exemplary drawings, the present invention is embodied in a composite fiber-resin rod with an alternately solid or rigid reinforcing and hollow cross-section, and a pultrusion method for its production.

The conventionally pultruded solid rod is often too heavy for some applications, such as shovel handles. At the same time, the conventionally pultruded hollow rod is too weak at high stress points for some of these same applications. With a modification of either method, involving boring out the solid rod or plugging the hollow rod, it is possible to produce a reinforced hollow rod using conventional techniques, but both methods have major drawbacks including high cost and lowered strength.

In exemplary FIG. 1 the method of this invention is schematically illustrated. A fiber material 10, is drawn off of a series of spools or bales 12, then through a resin bath 13, and through a carding disc 14, into a die tube 15. The fibers are pulled through the die tube 15, and are heated and cured by a heating element 16, which surrounds the die tube 15. The cured rod 17, is pulled out of the die tube 15, by tractor type pullers 18 and cut into the desired length by a conventional cutting device 20.

In accordance with the method of the present invention, as the fibers 10 enter the die tube 15, alternating sections of a hollow plastic tubing 22 and a solid or rigid reinforcing core 24 are inserted into the center of the die tube 15 and are simultaneously surrounded by the fibers 10 and drawn into and through the die tube 15. By this method, a continuous hollow fiberglass rod can be quickly and easily manufactured with a reinforced section integrally included at any desired location. The method of this invention is trouble-free and reliable in use, is more economical than existing alternatives, and the end product of this invention is relatively strong due to the perfect molded fit of the solid or rigid reinforcing core to the outer fibers. Also, because of the compatibility of the adhesive systems, a perfect bond from the solid or rigid reinforcing core to the outer fibers is created.

An example of the cured rod 17, which is the product of the present invention, is illustrated in FIG. 2, and in this example, the product consists of a continuous rod which can be cut into lengths, each length having a portion which is filled by a geometrically solid reinforcing core 24, and another portion which is filled by the hollow plastic tubing 22. As will be discussed hereinafter, if it is desired to have more than one reinforced portion of rod per length of the finished product, additional cores can be inserted in the above described method as desired. If it is desired to have a solid portion of the finished rod at each end with the hollow portion in the center, a longer solid core 24 can be inserted in the method described above, and the cutting device 20 can be arranged to cut through the solid core at the desired location. For that matter, the reinforcing core can be introduced into the system wherever a stress point might occur for a given application.

FIG. 3 is a cross sectional view of a portion of the rod in the present invention showing the fiber-resin composite molded around the hollow plastic tubing 22. FIG. 4 illustrates the reinforced portion of the rod of the present invention in which the fiber-resin composite is molded around the geometrically solid core 24. In the preferred embodiment of the present invention, the geometrically solid core 24 is comprised of the same fiber-resin composite being formed around it to produce the continuous cured rod 17 of the present invention.

In exemplary FIG. 5, the product of the present invention is illustrated as arranged for use as a shovel handle 26. In this example, the lower portion of the handle 26 is reinforced by a solid core 24, and that lower portion is inserted into a socket 28 of a shovel blade 30. The portion of the handle 26 that is inserted into the socket 28 can be retained therein by a rivet or through bolt 32 or any other conventional means used for retaining wooden handles in the socket 28.

If desired, a conventional grip 34 can be secured into the opposite end of the handle 26 by an adhesive or any other conventional means. As mentioned above, if the outer end of the handle 26 is expected to be subjected to extraordinary stress, an additional core 24A can be inserted in the handle 26 to reinforce the handle in that area.

Exceptional test results have been achieved by employing the method and apparatus of the present invention. Federal specifications governing tools of the type described require that the highest grade wooden handle be capable of withstanding under certain specified conditions, a breaking strength of 175 lbs. Under these same specified conditions, standard hollow fiberglass handles have exhibited breaking strengths of about 225 lbs. The reinforced fiberglass handles manufactured in accordance with the present invention, have exhibited breaking strengths in excess of 800 lbs. Moreover, the handles of the present invention that have exhibited these extraordinary breaking strengths are only about 11% heavier than the much weaker wooden handles.

While a particular form of the invention has been illustrated and described, it will be apparent that various modifications can be made without departing from the spirit and scope of the invention. Accordingly, the invention is not to be limited, except as by the appended claims.

I claim:

1. A method for producing a continuous fiber-resin composite rod having an alternately non-reinforcing and reinforcing core, said method comprising the steps of:

alternately feeding sections of non-reinforcing core and relatively strong reinforcing core into the center of a pultrusion die tube;

surrounding said core sections with resin coated fibers;

pulling said core sections through the pultrusion die tube while keeping said core sections surrounded by said resin coated fibers; and curing said resin coated fibers about said core sections to form a bond therewith.

2. The method as set forth in claim 1 wherein said non-reinforcing core is hollow tubing.

3. The method as set forth in claim 2 wherein said hollow tubing is plastic tubing.

4. The method as set forth in claim 1 wherein said reinforcing core is a fiber-resin composite similar to the material of said resin-coated fibers surrounding said core sections.

5. The method as set forth in claim 4 wherein said reinforcing core is comprised of the same material as the resin-coated fibers surrounding said core sections.

6. The method as set forth in claim 1 wherein said reinforcing core is positioned along the length of said rod to increase the strength of said rod at critical stress points.

7. A generally elongated reinforced tool handle having a predetermined length, said tool handle comprising:

a core comprised of a non-reinforcing filler extending along a first portion of said predetermined length and a relatively strong reinforcing section extending along a second portion of said length, said first and second portions extending alternately longitudinally along the length of said tool handle, said reinforcing section of said core being located at a portion of said handle that is intended to withstand greater stress than the remainder of said handle; and a generally tubular jacket of fiber-resin material cured about said core to form an integral bond therewith.

8. A reinforced tool handle as set forth in claim 7 wherein said non-reinforcing filler is formed of a plastic material.

9. A reinforced tool handle as set forth in claim 8 wherein said non-reinforcing plastic filler is a hollow plastic tube.

10. A reinforced tool handle as set forth in claim 7 wherein said reinforcing section of said core is a fiber-resin composite similar to the material of said jacket formed around said core.

11. A reinforced tool handle as set forth in claim 10 wherein said reinforcing section of said core is formed of the same material as said jacket formed around said core.

12. A reinforced tool handle as set forth in claim 7 wherein said reinforcing section is geometrically solid to substantially fill said tubular jacket along said second portion of said length.

13. A handle as set forth in claim 7 wherein said reinforcing section has a length to extend substantially throughout a region of high stress during use.

14. A handle for tools such as shovels, rakes, hoes, forks, and the like which have a rearwardly projecting connector member for attaching the handle to such tools, said handle comprising:

a rod having a cured fiber-resin jacket which generally surrounds a substantially hollow inner portion, said jacket providing the primary strength of said rod;

a reinforcing core integrally included within said inner portion in one or more areas likely to be subjected to high stress while said handle is in use, at least one segment of said reinforcing core being located generally at one end of said handle and having a length extending coaxially with said handle in both directions substantially beyond the rear end of the connector member when said handle is attached to the connector member; and a non-reinforcing core integrally included within said inner portion, said non-reinforcing core alternately spaced longitudinally along the length of said rod with said reinforcing core.

15. A handle as set forth in claim 14 wherein said reinforcing core is a geometric solid.

16. A handle as set forth in claim 14 wherein said reinforcing core is formed of a fiber-resin composite similar to the material of said jacket.

17. A handle as set forth in claim 14 wherein said reinforcing core is integrally formed within said jacket to achieve a perfect molded fit of said reinforcing core to said jacket.

18. A handle as set forth in claim 17 wherein said reinforcing core is formed of the same material as said jacket.

19. A handle as set forth in claim 14 wherein said non-reinforcing core is formed of a plastic material.

20. A handle as set forth in claim 19 wherein said non-reinforcing core is a substantially hollow plastic tube.

21. A handle as set forth in claim 14 wherein said reinforcing core and said non-reinforcing core are integrally formed within said jacket to achieve a substantially perfect molded fit of said reinforcing core and said non-reinforcing core to said jacket.

* * * * *